(12) United States Patent
Petillon et al.

(10) Patent No.: US 8,738,317 B2
(45) Date of Patent: May 27, 2014

(54) INERTIAL MEASUREMENT DEVICE AND AN AIRCRAFT INCLUDING SUCH A DEVICE

(75) Inventors: Jean Paul Petillon, Miramas (FR); Antoine Carayon, La Fare les Oliviers (FR)

(73) Assignee: Airbus Helicopters, Marignane Cedex (FR)

(*) Notice: Subject to any disclaimer, the term of this patent is extended or adjusted under 35 U.S.C. 154(b) by 278 days.

(21) Appl. No.: 13/156,591

(22) Filed: Jun. 9, 2011

(65) Prior Publication Data

US 2011/0313703 A1 Dec. 22, 2011

(30) Foreign Application Priority Data

Jun. 14, 2010 (FR) .................................... 10 02497

(51) Int. Cl.
| | | |
|---|---|---|
| *G01P 15/18* | (2013.01) | |
| *G01C 19/08* | (2006.01) | |
| *G06F 19/00* | (2011.01) | |
| *G01P 15/14* | (2013.01) | |

(52) U.S. Cl.
USPC ............... 702/145; 702/96; 702/144; 73/493; 73/504.02

(58) Field of Classification Search
CPC ......... G01P 15/18; G01P 15/14; G01C 19/08; G06F 19/00
USPC ................. 702/96, 144, 145; 73/1.77, 503.3, 73/504.18, 514.15, 493, 504.02
See application file for complete search history.

(56) References Cited

U.S. PATENT DOCUMENTS

| | | | | |
|---|---|---|---|---|
| 3,240,860 | A | * | 3/1966 | McCarthy .................... 74/5.6 D |
| 3,424,010 | A | | 1/1969 | Pollack |
| 3,509,765 | A | * | 5/1970 | Stevenson et al. .......... 73/178 R |
| 3,961,535 | A | | 6/1976 | Blitz |
| 5,272,922 | A | | 12/1993 | Watson |
| 5,349,855 | A | | 9/1994 | Bernstein |
| 6,516,283 | B2 | | 2/2003 | McCall |

(Continued)

FOREIGN PATENT DOCUMENTS

| | | |
|---|---|---|
| EP | 0292339 A1 | 11/1988 |
| EP | 2068118 A1 | 6/2009 |
| FR | 2614694 A1 | 11/1988 |
| FR | 2832136 A1 | 5/2003 |
| JP | 02078961 A | 3/1990 |
| WO | 2007111978 A2 | 10/2007 |

OTHER PUBLICATIONS

Search Report and Written Opinion; Application No. FR 1002497; dated Mar. 22, 2011.

*Primary Examiner* — Michael Nghiem
*Assistant Examiner* — Alexander Satanovsky
(74) *Attorney, Agent, or Firm* — Brooks Kushman P.C.

(57) ABSTRACT

The present invention relates to an inertial measurement device secured to a structure of a vehicle for which it is desired to measure speeds and/or accelerations, the device comprising at least one piece of moving equipment in rotation about a stationary axis of rotation Y relative to the structure, said moving equipment including at least two measurement device having respective sensitivity axes X' and Z' that are mutually orthogonal and that lie in a plane perpendicular to the stationary axis of rotation Y, a motor for driving the moving equipment in rotation, device for determining the angular position of the moving equipment, device for responding to the angular position of the moving equipment to determine the projection of the measurements taken in the rotary frame of reference axes X' and Z' by the said at least two measurement device onto a vehicle frame of reference X and Z.

2 Claims, 3 Drawing Sheets

(56) References Cited

U.S. PATENT DOCUMENTS

| | | |
|---|---|---|
| 6,552,534 B2 * | 4/2003 | Desbiolles et al. ...... 324/207.25 |
| 7,066,004 B1 | 6/2006 | Kohler |
| 7,135,860 B2 * | 11/2006 | Miya et al. ............... 324/207.25 |
| 7,412,775 B1 | 8/2008 | Karnick |
| 7,481,109 B2 * | 1/2009 | Moore et al. ............... 73/504.02 |
| 7,561,945 B2 * | 7/2009 | Giraudy et al. ................... 701/5 |
| 2005/0226306 A1 | 10/2005 | Glantz |
| 2005/0284222 A1 | 12/2005 | Johnson |

* cited by examiner

INERTIAL MEASUREMENT DEVICE AND AN AIRCRAFT INCLUDING SUCH A DEVICE

CROSS REFERENCE TO RELATED APPLICATIONS

This application claims the benefit of FR 10 02497 filed on Jun. 14, 2010, the disclosure of which is incorporated in its entirety by reference herein.

BACKGROUND OF THE INVENTION (1) Field of the Invention

The present invention relates to the general technical field of inertial measurement systems and devices used in aviation and more particularly in aircraft, of the airplane, rotorcraft, or helicopter kinds.

The present invention relates more particularly to an inertial measurement device for mounting on board an aircraft.

Piloting and guiding an aircraft require the pilot to have an objective perception of the angles of inclination and of the heading of the aircraft.

In visual flight, the angles of inclination may be perceived directly by viewing the outside environment. The heading and variation in heading may also be estimated by landmarks. The use of a magnetic compass makes it possible to perform absolute estimation and is essential for most kinds of navigation.

When flying without visibility, special instruments are required to mitigate the lack of outside visual references. For angles of inclination and for heading, the instrument in question is referred to as an attitude and heading reference system (AHRS) and it is associated with a multifunction display (MFD) screen.

The manufacture of an AHRS requires gyros to be used that present accuracy (or drift) of the order of a few degrees per hour. Over the last two decades, fiber optic gyros (FOGs) have performed this function well, with drift often being less than one degree per hour.

With the arrival of so-called micro-electro mechanical systems (MEMS), gyros have become available at a price that is of the same order of magnitude as the price of a monolithic silicon integrated circuit (since the manufacturing methods are the same), i.e. a price that is extremely low.

Unfortunately, the bias (or drift) of such gyros from one run to another can often be measured in thousands of degrees per hour, whereas the stability of bias within a run is no better than about ten degrees per hour and is often as great as about one hundred degrees per hour under the effect of rapid changes of temperature. MEMS technology therefore misses the bias stability required for achieving the performance of high integrity AHRS instruments such as those required for operations under instrument flight rules (IFRs) by a factor of ten.

Of the three measurement axes, i.e. the yaw axis, the roll axis, and the pitching axis, it is the yaw axis that requires the greatest accuracy, since an AHRS instrument is often required to provide a heading, even in the absence of a magnetometer. Such a mode of operation is referred to as directional mode. Aircraft certification rules for this mode of operation require drift to be less than fifteen degrees per hour. Such performance is not achieved in reliable and repeatable manner using known gyros based on MEMS technology.

(2) Description of Related Art

By way of example, document U.S. Pat. No. 3,424,010 discloses an inertial measurement device having two gyros mounted at 90° and rotating relative to an axis perpendicular to the measurement plane for measuring two speeds of rotation given by the two gyros.

That device makes it possible to attenuate the measurement biases of two of the three angular speed components, but it is based on a speed of rotation that is fast since it is greater than the maximum angular speed of the carrier aircraft. Since such a device is not based on a constant inertial speed of rotation, its performance is mediocre. In addition, the high speed of rotation that is required gives rise to fast wear of the mechanisms and to high consumption of electricity.

To reduce the instabilities of the biases of MEMS gyros, document JP 02078961 (angular velocity detecting device) discloses devices in which bias variations are compensated by making temperature measurements in association with an interpolation table. Those devices present the drawback that is associated with the fact that the curve plotting the sensitivity of bias to temperature is itself not stable over time so it is necessary to perform periodic calibrations in order to mitigate the effects of aging.

Devices making use of temperature regulation are also known, e.g. from document FR 2 832 136 (a device for hermetically encapsulating a component that needs to be protected from all stresses). Such devices require large amounts of electrical power and suffer from a thermal stabilization time that is unacceptable on starting.

Also known, e.g. from document U.S. Pat. No. 7,066,004, is an inertial measurement device comprising an assembly of MEMS technology gyros and actuators for eliminating static or dynamic phase bias. Because of the difficulty of using MEMS technology to make bearings that provide freedom to perform a complete rotation about an axis, the device described in that document is based on rotary movements of limited amplitude that are intermittent and in alternating directions. The hinges allowing the alternating rotary movements are constituted by flexible elements. Those flexible elements, made of MEMS technology, are typically silicon structures of micrometer size, and they are very fragile in the event of an impact.

SUMMARY OF THE INVENTION

An object of the invention is thus to propose a novel inertial measurement device making it possible to overcome the above-mentioned limitations, and to do so regardless of the technology used, so as to attenuate significantly or even eliminate the bias of said device.

In particular, the invention seeks to propose a novel inertial measurement device using MEMS technology that is capable of overcoming the above-mentioned limitations, while improving its performance.

Another object of the invention is to provide a novel inertial measurement device that presents performance that is remarkable while being of a cost price that is extremely low.

The objects given to the invention are achieved with the help of an inertial measurement device secured to a structure of a vehicle for which it is desired to measure angular speeds and/or linear accelerations, the device including at least one piece of equipment that is movable in rotation about an axis Y that is stationary relative to the structure having a frame of reference X, Y, Z, said moving equipment including at least two measurement means with respective sensitivity axes X' and Z' that are mutually orthogonal and that are situated in a plane perpendicular to the stationary axis of rotation Y, an electric motor for driving rotation of the moving equipment, means for determining the angular position of the moving equipment relative to the structure, and calculation means for responding to the angular position of the moving equipment to determine the projection of the measurements performed along the rotary axes X', Z' by said at least two measurement means onto the stationary axes X and Z of the structure, wherein the motor includes means for controlling at least one inertial speed of rotation of the moving equipment in such a manner that the sine and cosine functions of the angle of the moving equipment relative to the inertial frame of reference are substantially zero on average over an integer number of revolutions, the speed of rotation being greater than a reference value, said reference value imposing a frequency shift to the bias of the measurement means, said shift being greater than the instability bandwidth of the biases of said measurement means.

In an embodiment of the inertial measurement device in accordance with the invention, the motor is controlled by means enabling the moving equipment to have a speed of rotation that is substantially constant in the inertial frame of reference.

In another embodiment of the inertial measurement device in accordance with the invention, the moving equipment is a rotary substrate constituted by the rotor of the electric motor having at least two measurement means and permanent magnets mounted thereon.

In an embodiment of the inertial measurement device in accordance with the invention, the measurement means are gyros.

In another embodiment of the inertial measurement device in accordance with the invention, the measurement means are accelerometers.

In another embodiment of the inertial measurement device in accordance with the invention, each of the measurement means comprises a gyro and an accelerometer.

Accelerometer biases generally have less influence on the error of an AHRS instrument, but if consideration is given to the cost of the mechanism enabling the moving equipment to rotate, the extra cost of including two accelerometers in the moving equipment becomes negligible. Furthermore, placing two gyros and two accelerometers on the moving equipment makes it possible to improve the accuracy of said gyros and/or to reduce the cost of calibrating them, such as applying temperature compensation.

In an embodiment of the inertial measurement device in accordance with the invention, the axis Y extends in a lateral direction of the vehicle of the aircraft kind, corresponding to its pitching axis, and the axes X and Z onto which the measurements taken on the rotary sensitivity axes X' and Z' are projected correspond respectively to the roll axis and to the yaw axis of said vehicle or aircraft, the projections of the measurements from the rotary means onto said axes X and Z being substantially free from bias.

In an embodiment in accordance with the invention, the inertial measurement device includes additional measurement means fastened on a stationary support of the structure and presenting a sensitivity axis that is stationary relative to the structure, which axis is directed along the axis Y and is perpendicular to the plane of rotation of the moving equipment.

In another embodiment in accordance with the invention, the moving equipment includes additional measurement means constrained to rotate with the moving equipment and presenting a rotary sensitivity axis coinciding with the axis Y and perpendicular to the plane of rotation of the moving equipment, said additional measurement means serving, if necessary, to regulate the inertial speed of rotation of the moving equipment.

By way of example, the additional measurement means comprise at least one gyro.

As a variant, the inertial measurement device in accordance with the invention includes a second piece of moving equipment in rotation about the axis X that is stationary relative to the structure, said second moving equipment including at least two measurement means having respective sensitivity axes Y' and Z' that are mutually orthogonal and that are situated in a plane perpendicular to the stationary axis of rotation X, the measurements of the rotary measurement means as projected onto said axes Y and Z then being substantially free from bias.

In an embodiment of the inertial measurement device in accordance with the invention, the axis Y lies in a plane formed by the roll and pitching axes of the vehicle of the aircraft kind.

In an embodiment of the inertial measurement device in accordance with the invention, the means for determining the angular position of the moving equipment relative to the structure of the vehicle is a contactless absolute sensor for measuring angles, e.g. based on Hall effect sensors, e.g. those sold by the supplier Austria Microsystem, under the reference AS5043.

In a variant embodiment of the inertial measurement device in accordance with the invention, the means for determining the angular position of the moving equipment relative to the structure of the vehicle are based on Hall effect sensors of the brushless motor, thereby enabling the measurements to be made modulo the pole pitch. Under such circumstances, an on/off sensor such as a light-emitting diode (LED) associated with a phototransistor serves to lift the ambiguity from the pole pitch and to recover an absolute measurement.

In an embodiment of the inertial measurement device in accordance with the invention, the measurement means are sensors based on MEMS technology, of the MEMS gyro kind.

In an embodiment in accordance with the invention, the inertial measurement device includes inductive means for electrically powering at least one piece of moving equipment and also for transferring measurements made from at least one piece of moving equipment to a stationary electronic unit.

In an embodiment of the inertial measurement device in accordance with the invention, said device includes additional processor means for eliminating the spectrum line that appears at the inertial rotation frequency of the moving equipment.

The objects given to the invention are also achieved with the help of an inertial measurement method for a vehicle or aircraft for which it is desired to measure speeds and/or accelerations, the method consisting in setting at least one piece of moving equipment into rotation about an axis of rotation Y that is stationary relative to a structure having a frame of reference X, Y, Z, said moving equipment including at least two measurement means with respective sensitivity axes X' and Z' that are mutually orthogonal and that are situated in a plane perpendicular to the stationary axis of rotation Y, in determining the angular position of the moving equipment relative to the structure, and in determining to the angular position of the moving equipment to determine the projection of the measurements taken along the rotary axes X', Z' by said at least two measurement means onto the stationary axes X and Z of the structure, wherein the method consists in controlling at least one inertial speed of rotation of the moving equipment in such a manner that the sine and cosine functions of the angle of the moving equipment relative to the inertial frame of reference are substantially zero on average over an integer number of revolutions, the inertial speed of rotation being greater than a reference value and imposing a frequency shift to the bias of the measurement means, said shift being greater than the instability bandwidth of the biases of said measurement means.

The objects given to the invention are also achieved with the help of a control and regulation method for servo-controlling the inertial speed of rotation of the electric motor of an inertial measurement device as described above on a setpoint, wherein the method consists in:

setting the setpoint and measuring the inertial speed of rotation;

using an internal regulation loop to amplify the difference between the setpoint and the inertial speed of rotation to apply torque control to the electric motor, thereby delivering the inertial speed of rotation at the output from said internal regulation loop;

integrating the inertial speed of rotation so as to obtain the inertial angle of rotation $\beta$;

calculating the cosine and sine functions of the inertial angle of rotation sin $\beta$ and cos $\beta$;

calculating the integrals Is and Ic of the above sine and cosine functions;

identifying the coordinates Xc and Yc of the center of the circle defined by the above values of the integrals;

applying a negative gain k to Xc and to Yc and calculating a correction term that is a function of k, Xc, Yc, and $\beta$, e.g. equal to k·Xc·sin $\beta$+k·Yc·cos $\beta$; and adding said correction term to the setpoint to apply feedback to the internal regulation loop so that said integrals are zero on average over an integer number of revolutions.

In an implementation of the method of the invention, the coordinates Xc and Yc are obtained by the least squares method.

The objects given to the invention are also achieved with the help of an inertial measurement unit (IMU), including at least two inertial measurement devices as described above, and wherein the axes of rotation of said two devices are mutually perpendicular so that the IMU produces measurements with attenuated bias on three dimensions.

The objects of the invention are also achieved with the help of equipment of the attitude heading reference system (AHRS) kind or an aircraft including an inertial measurement device as described above.

An advantage of the inertial measurement device in accordance with the invention lies in eliminating its measurement biases.

Another advantage of the inertial measurement device in accordance with the invention is associated with its reliability of operation. In the event of a breakdown of the motor driving the moving equipment, the device finds itself in a situation in which the angle of rotation is no longer under control, but is nevertheless measured, such that like known devices, the device continues to deliver three measurements on three orthogonal directions that are stationary relative to the structure, providing the angle sensor is not damaged.

Another advantage of the inertial measurement device in accordance with the invention lies in the possibility of using gyros of poorer quality, such as MEMS gyros, thus enabling the device to be implemented in miniaturized form, while presenting accuracy that is equivalent to the accuracy of fiber optic technology gyros (FOGs), with lower electricity consumption and much greater reliability.

Another advantage of the inertial measurement device in accordance with the invention is that it makes it possible to omit temperature stabilization stages, while nevertheless providing significantly improved performance. The device is thus immediately operational on being switched on.

Another advantage of the inertial measurement device in accordance with the invention is that it makes it possible to omit performing precise temperature compensation, thereby constituting a device that is very robust in terms of aging and eliminating any preventative maintenance such as periodic re-calibration.

Another advantage of the inertial measurement device in accordance with the invention lies in the use of an inertial speed of rotation of the rotary equipment that is less than the maximum rate of turn of the aircraft or the vehicle. This reduces the wear of the mechanisms and increases the accuracy of the device, insofar as the inertial speed of rotation is taken into consideration.

Another advantage of the inertial measurement device in accordance with the invention lies in its insensitivity to aging corresponding to deterioration over time in its residual temperature sensitivity. The device in accordance with the invention behaves like permanent calibration means.

The control and regulation method in accordance with the invention presents the advantage of not requiring high electricity consumption for the electric motor while not degrading control accuracy. It is desired to limit the electric currents that flow in the coils of the electric motor to values that are as low as possible. Consequently, the internal regulation loop presents only low authority in terms of torque, and the inertial speed of rotation is inevitably disturbed by the dynamic behavior of the carrier, which is influenced in particular by variations in bearing friction and by eddy currents. These disturbances are compensated by the control and regulation method in accordance with the invention.

BRIEF DESCRIPTION OF THE DRAWINGS

The invention and its advantages appear in greater detail from the following description of embodiments given by way of non-limiting illustration and with reference to the accompanying figures, in which:

FIG. 2b is another diagrammatic illustration of the inertial measurement device of FIG. 2a;

FIG. 8 shows another embodiment of an inertial measurement device in accordance with the invention;

FIG. 9 is a diagram illustrating treatment of data from an inertial measurement device in accordance with the invention as shown in FIG. 8;

FIG. 10 is a diagram illustrating optional additional treatment of data from an inertial measurement device in accordance with the invention, additionally serving to eliminate the noise spectrum line that results from imparting rotation; and FIG. 11 is a fragmentary section view of an embodiment of inductive means for power supply and data transfer in an inertial measurement device in accordance with the invention.

DETAILED DESCRIPTION OF THE PREFERRED EMBODIMENTS

Elements that are structurally and functionally identical and that are present in more than one of the figures are given the same numerical or alphanumerical references in each of them.

Figure 1:
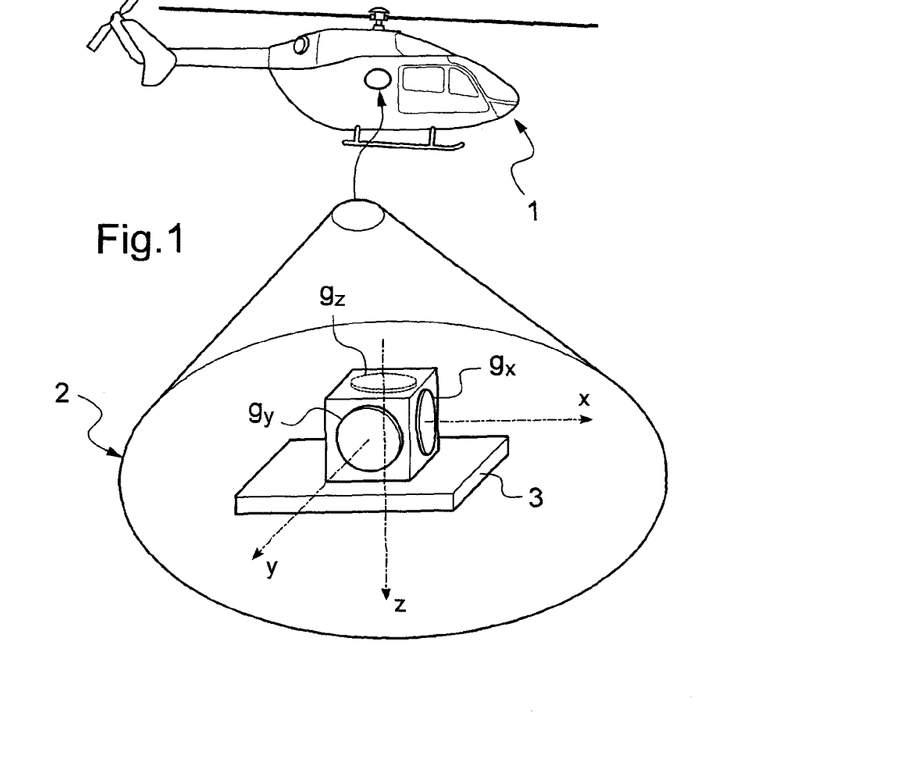
FIG. 1 shows an example of gyros in a prior art inertial measurement device installed in an aircraft.

FIG. 1 shows an example of gyros installed in an aircraft in the manner of the prior art.

A helicopter 1 or aircraft includes an AHRS instrument 2. This instrument has gyros gx, gy, and gz that are stationary relative to the fuselage of said helicopter, being mounted on a support 3 that is secured to the structure of the helicopter 1. The term "structure" also covers the fuselage of an aircraft. The gyros gx, gy, and gz present respective sensitivity axes oriented on three respective directions X, Y, Z, defining an X, Y, Z frame of reference tied to the structure of the helicopter 1.

Figure 2A:
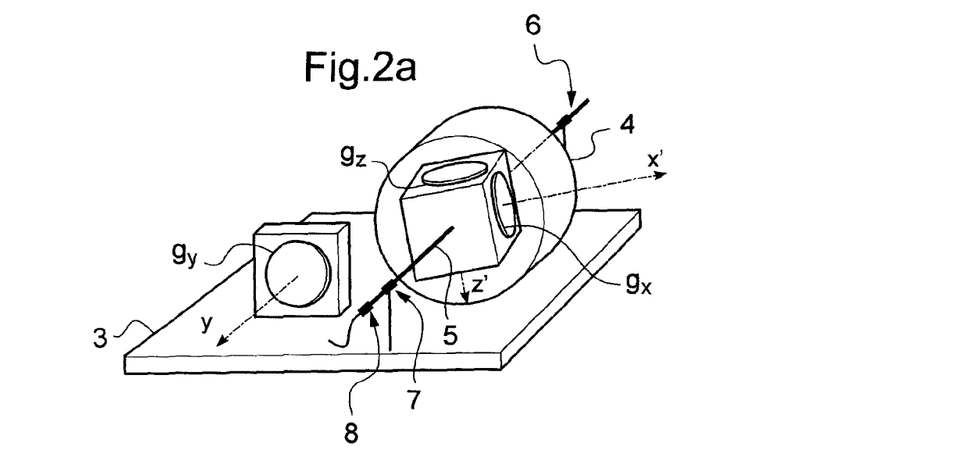
FIG. 2a is a diagrammatic illustration of an embodiment of an inertial measurement device in accordance with the invention having two rotary measurement means and one stationary complementary measurement means.

FIG. 2a is a diagram showing an embodiment of an inertial measurement device according to the invention having a gyro gy that is mounted stationary on the support 3 with its sensitivity axis being directed along the lateral direction Y.

The gyros gx and gz are installed in a drum 4 constituting moving equipment that rotates about an axis 5 of the helicopter, in this figure and by way of example, the lateral axis, i.e. parallel to the direction Y.

The sensitivity axes X' and Z' of the gyros gx and gz are mutually orthogonal and they lie in a plane perpendicular to the lateral axis of rotation 5. The plane defined by the rotary axes X', Z' thus always coincides with the plane defined by the axes X, Z regardless of the angle α made by the drum 4 relative to the structure of the helicopter 1. An angle β is also defined that corresponds to the angular position of the drum 4 relative to an inertial frame of reference.

The drum 4 is driven in rotation by a direct-drive brushless electric motor 6. The motor 6 includes means for controlling at least a speed of rotation $\omega_i$ of the moving equipment, which speed is substantially constant relative to an inertial frame of reference.

The inertial speed of rotation $\omega_i$=dβ/dt of the drum 4 relative to the inertial frame of reference may be very slow, such that the power required of the motor is likewise very low. This has a positive influence on the wear of the corresponding bearings. It suffices for said inertial speed of rotation to be significantly faster than the frequency bandwidth of the bias instability of the gyro, i.e. a few millihertz, giving an inertial speed of rotation lying for example in the range 10 revolutions per minute (rpm) to 60 rpm.

The angular position α of the drum 4 relative to the structure is measured by a contactless absolute sensor 7 of the Hall effect sensor kind. The angle α is measured relative to the structure. It corresponds to the angle formed between the axes X and X'.

The contactless angle-measuring absolute sensor may for example be based on Hall effect sensors, e.g. those sold by the supplier Austria Microsystem under the reference AS5043.

In a variant embodiment of the inertial measurement device in accordance with the invention, the means for determining the angular position of the moving equipment relative to the vehicle structure are based on the Hall effect sensors of the brushless motor 6, thereby enabling measurements to be performed modulo the pole pitch. Under such circumstances, an on/off sensor such as an LED associated with a phototransistor serves to lift the ambiguity concerning the pole pitch and to retrieve an absolute measurement.

Electric power is supplied to the gyros gx and gz and the measurements performed by said gyros gx and gz are collected via one or more inductive means 8, i.e. means that are contactless.

Figure 3:
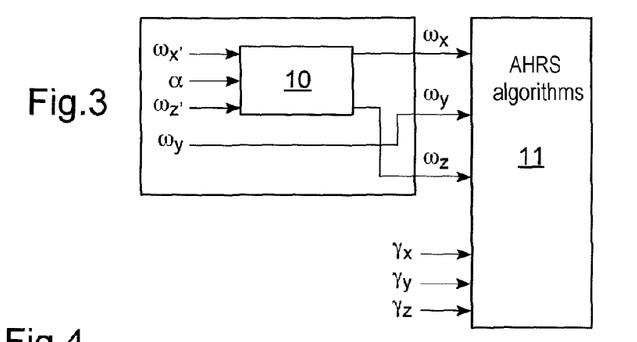
FIG. 3 is a diagram illustrating processing of data from an inertial measurement device in accordance with the invention as shown in FIG. 2a or 2b.

FIG. 3 is a diagram representing processing of data from an inertial measurement device in accordance with the invention, as shown in FIG. 2a.

The device in accordance with the invention also includes calculation means for responding to the angular position α of the moving equipment to determine the projection of measurements performed about the rotary axes X', Z' by said at least two measurement means onto the axes X and Z of the structure of the vehicle. These measurements of rotary angular speed components about stationary axes X, Z are then expressed relative to the frame of reference of the fuselage.

For this purpose, the calculation means include a preprocessor unit 10 for performing preprocessing on the measurements from the rotary gyros gx and gz.

Below, $\omega_x$ designates the inertial angular speed component of the structure about the axis X, $\omega_z$ designates the inertial angular speed component of the structure about the axis Z, and $\omega_y$ designates the inertial angular speed component of the supports about the axis Y.

The preprocessor unit 10 acquires both the angle α of the drum 4 as delivered by the contactless absolute sensor 7 and measurements of the inertial angular speed components $\omega_{x'}$ and $\omega_{z'}$ of the moving equipment about the axes X' and Z', said measurements coming from the rotary gyros gx and gz. The preprocessor unit 10 then delivers measurements of the inertial angular speed components of the structure relative to the axes X and Z, i.e. $\omega_x$ and $\omega_z$. The processing performed by the unit 10 is a projection operation, or a change of frame of reference, that may be expressed mathematically by a matrix multiplication as set out below:

$$\begin{bmatrix} \omega_x \\ \omega_z \end{bmatrix} = \begin{bmatrix} \cos\alpha & -\sin\alpha \\ \sin\alpha & -\cos\alpha \end{bmatrix} \times \begin{bmatrix} \omega_{x'} \\ \omega_{z'} \end{bmatrix}$$

The angular speed component measurements about the respective axes X, Y, and Z, i.e. the components $\omega_x$ and $\omega_z$ that have been subjected to change of frame of reference, together with the component $\omega_y$ as delivered directly by the gyro gy, are then forwarded to a processor unit 11. This processor unit 11 implements algorithms that are specific to AHRS instruments and that are themselves known. By way of example, reference may be made to document EP 0 292 339 B1 relating to an integrated attitude-determining system for aircraft. Those algorithms also need to process acceleration components $\gamma_x$, $\gamma_y$, and $\gamma_z$.

Figure 4:
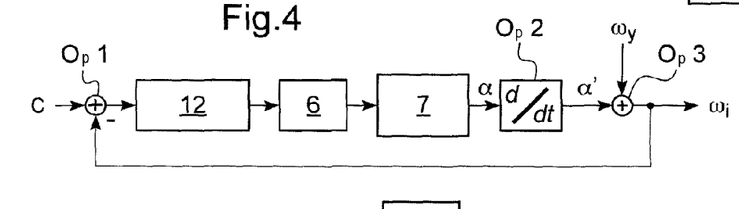
FIG. 4 is an illustration of a simplified control relationship for the motor of an inertial measurement device in accordance with the invention as shown in FIG. 2a or 2b.

FIG. 4 illustrates a simplified control relationship for the motor 6 of an inertial measurement device in accordance with the invention as shown in FIG. 2, which relationship serves to control the inertial angular speed of rotation $\omega_i$ of the drum 4, which speed is substantially constant.

A speed setpoint C or w is input from an operator $O_p1$ that subtracts from said setpoint C the present value of the inertial speed of rotation $\omega_i$. The inertial speed of rotation $\omega_i$ corresponds to the angular speed of the drum 4 relative to the inertial frame of reference. Thus, $$\omega_i = \omega_y + d\alpha/dt = d\beta/dt$$

where $d\alpha/dt = \alpha'$ is the time derivative of the angle $\alpha$ and $d\beta/dt$ is the time derivative of the angle $\beta$.

The subtracter $O_p1$ then delivers a signal corresponding to $C - \omega_i$ to control means 12 that control the motor 6 so as to eliminate said difference signal.

The absolute sensor 7 and a differentiator $O_p2$ determine the speed of rotation $\alpha' = d\alpha/dt$ of the drum 4 about the lateral axis 5. The inertial speed of rotation $\omega_i$ is then obtained by adding the angular speed component $\omega_y$ to $\alpha'$ by means of a summing circuit $O_p3$.

In an embodiment, rotation of the drum 4 is sustained at a speed that is constant relative to the inertial frame of reference by means of the direct-drive brushless motor 6. This speed of rotation is of the order of 10 rpm to 60 rpm, i.e. 60 degrees per second (°/s) to 360°/s, which may be less than the maximum turn rate of the helicopter. By way of example, an aggressive roll turn rate for an aircraft is of the order of 100°/s.

By way of example, if the setpoint C is 60°/s and the aircraft can maneuver in a range −100°/s to +100°/s, then the angular speed of the drum 4 relative to the structure, i.e. $d\alpha/dt$, lies in the range −40°/s to +160°/s, while the inertial speed of the drum 4 is maintained at 60°/s.

Figures 2B, 8, 9, 10, 11:
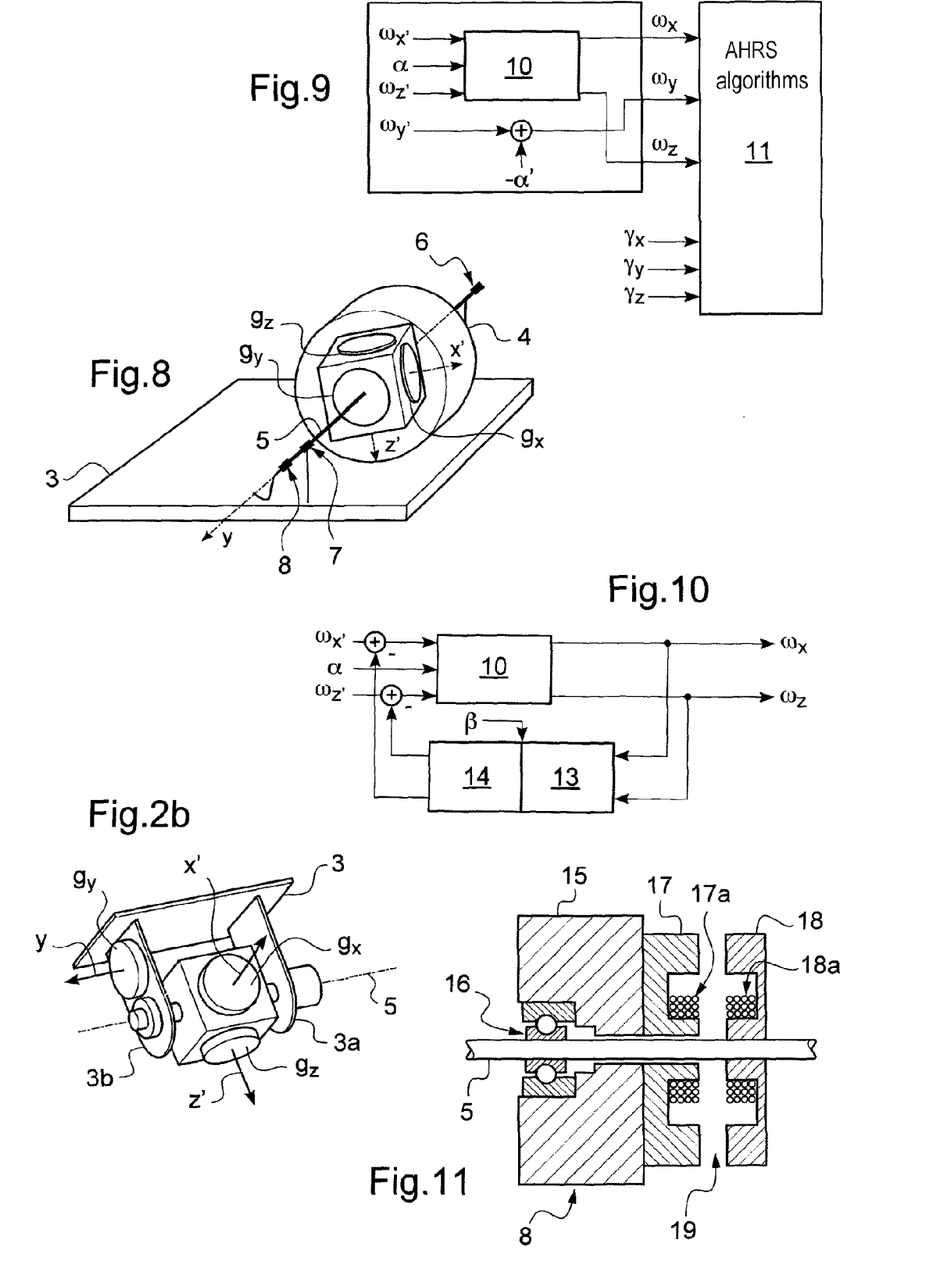
Figure 5:
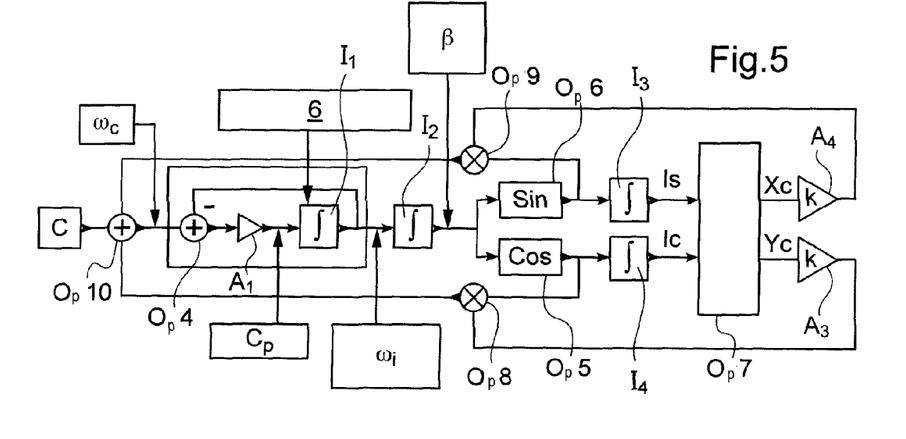
FIG. 5 illustrates another control relationship for the motor of an inertial measurement device in accordance with the invention as shown in FIG. 2a or 2b, said control relationship serving to compensate the effect of inertial rotation speed fluctuations.

FIG. 5 shows a regulation loop based on a control relationship for the motor 6 of an inertial measurement device in accordance with the invention as shown in FIG. 2a or 2b, said control relationship serving to compensate for fluctuations in the inertial speed of rotation $\omega_i$. FIG. 5 is described in greater detail below.

Figure 6:
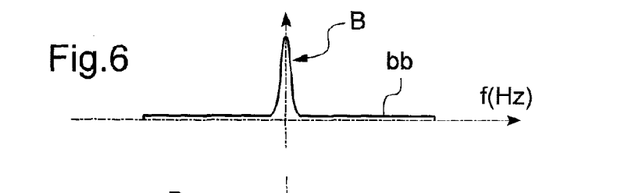
FIG. 6 is a diagram of the spectrum density of noise power directly at the output from a gyro, being constituted essentially by bias corresponding to the DC component represented by a vertical arrow (a so-called "Dirac" pulse) and low frequency components represented by a bell-shaped curve centered on zero frequency.

FIG. 6 is a diagram of the power spectrum density at the output from a gyro. There can be seen therein the effect of an unstable bias B accompanied by white noise bb. The gyro errors that are the most troublesome for an AHRS instrument are the zero frequency bias and the instability of the very low frequency bias, with the correlation time constant of instabilities of MEMS gyro biases being typically of the order of 100 seconds (s), which corresponds to a bandwidth of ±1.6 millihertz (mHz). The units up the ordinate may be expressed for example in degrees per hours squared per hertz, i.e.: (°/h)²/Hz.

Figure 7:
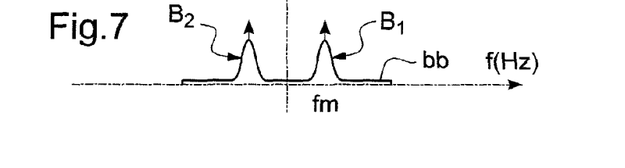
FIG. 7 is a diagram showing the spectrum density of noise power at the outlet from the device in accordance with the invention, this spectrum density having the feature of presenting very little energy around the DC component.

With the inertial measurement device in accordance with the invention, the gyro error spectrum $\delta\omega_x$ is offset in frequency, as shown in FIG. 7.

The inertial measurement device in accordance with the invention thus makes it possible to eliminate the bias B. The noise power nevertheless remains unchanged, the bias B being transformed into noise peaks B1 and B2 around the frequency of rotation $fm = \pm\beta'/2\pi$ where $\beta' = d\beta/dt$, i.e. the inertial speed of rotation of the equipment.

Such a noise spectrum has a much smaller effect on the AHRS instrument and it is not troublesome for the autopilot or "automatic flight control system" (AFCS). In addition, since the frequency of the spectrum is known, its amplitude and its phase can be identified so as to be eliminated.

FIG. 8 shows another embodiment of an inertial measurement device in accordance with the invention. In this embodiment, the gyro gy is installed in the drum 4 and is oriented in such a manner that its sensitivity axis coincides with the axis of rotation Y of said drum 4. The gyro gy is constrained to rotate with the moving equipment. This arrangement presents the advantage of providing a direct measurement of the inertial angular speed of the moving equipment, as is required by the control relationship applied to the motor 6. Thus, $$\omega_y = \beta' \text{ and } \omega_y = \omega_y - \alpha'$$

FIG. 9 is a diagram of processing applied to data from an inertial measurement device in accordance with the invention and as shown in FIG. 8.

In this embodiment of the inertial measurement device in accordance with the invention, the calculation means acquire both the angle $\alpha$ of the drum 4 from the contactless absolute sensor 7 and the measurements of the angular speed components $\omega_{x'}$ and $\omega_{z'}$ about the axes X' and Z' from the rotary gyros gx and gz. The preprocessor unit 10 then performs a change of frame of reference that may be expressed mathematically by a matrix multiplication as shown below:

$$\begin{bmatrix} \omega_x \\ \omega_z \end{bmatrix} = \begin{bmatrix} \cos\alpha & -\sin\alpha \\ \sin\alpha & -\cos\alpha \end{bmatrix} \times \begin{bmatrix} \omega_{x'} \\ \omega_{z'} \end{bmatrix}$$

The measurements of the angular speed components relative to the X, Y, Z frame of reference, i.e. $\omega_x$, $\omega_z$, and $\omega_y$, are subsequently forwarded to processing algorithms of the calculation means. These processing algorithms are specific to AHRS instruments and they are themselves known. Examples of algorithms are described for example in document FR 2 614 694.

In a particular embodiment of the invention, rejection of the bias that affects the measurements of the inertial angular speed components about the axes X and Z is further improved by ensuring that the sine and cosine functions of the angle $\beta$ of the moving equipment relative to the inertial frame of reference are zero on average over an integer number of revolutions.

By way of example, this result may be obtained by implementing the control and regulation method to servo-control the inertial speed of rotation $\omega_i$ of the electric motor 6 of the inertial measurement device on a setpoint $\omega_c$, which method is illustrated in FIG. 5.

The control and regulation method consists in setting the setpoint $\omega_c$ and in measuring the inertial speed of rotation $\omega_i$.

Thereafter, an internal regulation loop is used to amplify the difference $\omega_c - \omega_i$ between the setpoint $\omega_c$ and the inertial speed of rotation $\omega_i$ so as to apply torque control Cp to the electric motor 6 (i.e. control the current flowing through the stator windings of the motor 6), thereby delivering at the output from said internal regulation loop an inertial speed of rotation $\omega_i$ that is close to the setpoint $\omega_c$. The difference $\omega_c - \omega_i$ is generated by the difference operator $O_p4$ and is amplified using the amplifier $A_1$.

The electric motor 6 is represented as an integrator $I_1$.

Thereafter, an integrator $I_2$ is used to integrate the inertial speed of rotation $\omega_i$ so as to obtain the inertial angle of rotation $\beta$.

Thereafter, $\cos\beta$ and $\sin\beta$ are calculated using respective operations $O_p5$ and $O_p6$. This produces two signals representative of the weighting applied by the rotation to the biases of the gyros.

Thereafter, the integral Is of $\sin\beta$ and the integral Ic of $\cos\beta$ are calculated using respective integrators $I_3$ and $I_4$. With rotation at a uniform inertial angular speed, the two signals output by the integrators $I_3$ and $I_4$ travel round a circle having a center that is stationary.

Thereafter, the coordinates Xc, Yc of the center of the circle defined by the values Ic and Is are identified by means of an operator $O_p7$. By way of example, the coordinates Xc, Yc are identified by the least squares method implemented by the operator $O_p7$.

Thereafter, negative gain k is applied to the values Xc and Yc and correction terms k·Xc·sin β and k·Yc·cos β are calculated. The correction term k·Xc·sin β is obtained by an amplifier $A_4$ having negative gain k and by means of a multiplier $O_p9$. The correction term k·Yc·cos β is obtained by an amplifier $A_3$ of negative gain k and a multiplier $O_p8$.

Thereafter, the above correction terms are added to the setpoint $\omega_c$ to reinject a corrected setpoint to the input of the internal regulation loop, with this being done by a summing circuit $O_p10$. Feedback is thus applied to the setpoint $\omega_c$ so that the coordinates of the center of said circle are kept equal to zero.

This produces varying setpoints having the effect of keeping the circle defined by Is and Ic permanently centered on the origin of the representation frame of reference, without any static error.

The embodiment of FIG. 8 differs from that shown in FIG. 2a in that the gyro gy is no longer secured to the structure but is rather installed on the rotary drum 4, with its sensitivity axis coinciding with the axis of rotation 5. The gyro gy thus directly delivers the inertial speed of rotation $\omega_i = \omega_{y'}$. This speed may be kept constant in a particular implementation.

The angular speed of the aircraft about the axis Y, i.e. $\omega_y$, may then be calculated by subtracting from the measurement of the gyro gy the derivative of the angular position α of the drum 4 in application of the following relationship:

$\omega_y = \omega_{y'} - \alpha'$ where $\alpha' = d\alpha/dt$

In another embodiment, the angular speed component of the vehicle or the aircraft about the axis Y may be measured directly by a fourth gyro secured to the structure of said vehicle or aircraft. This avoids using the derivative of the angle α in order to reconstitute $\omega_y$. Taking such a derivative generates noise.

In another embodiment that is not shown, the inertial measurement device in accordance with the invention includes second moving equipment rotating about the axis of rotation X that is stationary relative to the structure. The second moving equipment has at least two gyros gy, gz with respective sensitivity axes Y' and Z' that are mutually orthogonal and that are situated in a plane perpendicular to the stationary axis of rotation X. The projection of the measurements from the rotary gyros gy, gz onto said axes Y and Z is thus free from bias.

Four measurement axes are thus available that are free from bias, or at least that are affected by bias that is greatly attenuated, including an axis Z with measurement redundancy, which may be useful from the point of view of the operating security of the inertial measurement device.

Such an embodiment makes it possible to have bias-free measurements in roll, in yaw, and in pitching.

FIG. 10 is a diagram of additional processing applied to data from an inertial measurement device in accordance with the invention for the purpose of eliminating the interfering noise spectrum line represented by the symmetrical peaks B1 and B2 in FIG. 7. In a certain embodiment of the inertial measurement device, the device further includes additional processor means for eliminating said residual noise spectrum line. The preprocessor unit 10 is thus advantageously associated with synchronous detector means and a lowpass filter 14.

The synchronous detector means 13, which also makes use of the sine and the cosine of the angle β as a reference clock, thus enables the peaks B1 and B2 to be identified.

By means of the invention, the frequency of the bias is changed, with the bias thus being transformed from an almost DC signal into a signal that is nearly sinusoidal having an effect on the AHRS that is negligible. Although the presence of this sinusoidal signal at the inertial speed of rotation of the drum 4, referred to as the modulation/demodulation frequency $fm = \beta'/2\pi$, is troublesome for other users such as the AFCS, the additional processor means serve to eliminate it or at least to attenuate it by synchronous detection, lowpass filtering, and subtraction from the measurements taken in the rotary frame of reference.

FIG. 2b is another illustration of the embodiment of the inertial measurement device in accordance with the invention as shown in FIG. 2a. The support 3 has two bearings 3a, 3b on the same axis that support the axis of rotation 5. The moving equipment includes the gyros gx and gz having respective sensitivity axes X' and Z'. The gyro gy is stationary with its sensitivity axis being oriented along the axis Y, being fastened to the support of the bearing 3b.

FIG. 11 is a fragmentary section view of an embodiment of the means 8 of the inertial measurement device according to the invention for delivering power and exchanging data by induction.

By way of example, the inertial measurement device has inductive means for delivering electrical power to at least one item of moving equipment and also for transferring the measurements it performs from at least one item of moving equipment to an electronic unit or portion that is stationary.

For this purpose, the induction device comprises a stationary base 15 supporting the shaft 5 via a ball bearing 16 and a stationary part 17 of a two-part ferromagnetic core 17 and 18. The stationary part 17 of the core is secured to the stationary base 15 and has a winding 17a. The part 18 of the core is the rotary part of said ferromagnetic core. This part is secured to the rotary shaft 5, and it includes a winding 18a. The parts 17 and 18, associated respectively with a stationary electronic unit and with a rotary electronic unit are separated by an airgap 19.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A control and regulation method for servo-controlling an inertial speed of rotation ($\omega_i$) of a piece of equipment movable in rotation about an axis of rotation that is stationary relative to a structural frame of reference, the method comprising:

setting a setpoint ($\omega_c$) of an electric motor configured to drive rotation of the moving equipment and measuring an inertial speed of rotation ($\omega_i$) of the moving equipment relative to an inertial frame of reference;

using an internal regulation loop to amplify a difference ($\omega_c - \omega_i$) between the setpoint ($\omega_c$) and the inertial speed of rotation ($\omega_i$) to apply torque control to the electric motor, thereby delivering the inertial speed of rotation ($\omega_i$) at the output from said internal regulation loop;

integrating the inertial speed of rotation ($\omega_i$) so as to obtain an inertial angle of rotation ($\beta$) of the moving equipment relative to the inertial frame of reference;

calculating $\cos \beta$ and $\sin \beta$;

calculating the integral (Is) of $\sin \beta$ and the integral (Ic) of $\cos \beta$;

identifying the coordinates (Xc, Yc) of a center of a circle defined by the values of the integrals (Ic) and (Is);

applying a gain (k) to the coordinates (Xc, Yc) and calculating a correction term that is a function of the gain (k), the inertial angle of rotation ($\beta$), and the coordinates (Xc, Yc); and adding said correction term to the setpoint ($\omega_c$) to apply feedback to said setpoint at the input of the internal regulation loop so that said integrals (Is and Ic) are zero on average over an integer number of revolutions.

2. A control and regulation method according to claim 1, the coordinates (Xc, Yc) being identified by the least squares method.

* * * * *